(12) United States Patent
Takakura (10) Patent No.: US 9,494,481 B2
(45) Date of Patent: Nov. 15, 2016

(54) DEVICE AND METHOD FOR DIAGNOSING EVAPORATED FUEL PROCESSING DEVICE

(71) Applicant: NISSAN MOTOR CO., LTD., Yokohama-shi, Kanagawa (JP)

(72) Inventor: Shinsuke Takakura, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 269 days.

(21) Appl. No.: 14/380,787

(22) PCT Filed: Mar. 5, 2013

(86) PCT No.: PCT/JP2013/055901
§ 371 (c)(1),
(2) Date: Aug. 25, 2014

(87) PCT Pub. No.: WO2013/133237
PCT Pub. Date: Sep. 12, 2013

(65) Prior Publication Data
US 2015/0013437 A1    Jan. 15, 2015

(30) Foreign Application Priority Data
Mar. 9, 2012  (JP) ................. 2012-052523

(51) Int. Cl.
*G01M 3/04*        (2006.01)
*F02M 25/08*      (2006.01)
(Continued)

(52) U.S. Cl.
CPC ........... *G01M 3/04* (2013.01); *F02M 25/0818* (2013.01); *F02M 2700/05* (2013.01); *G01M 3/26* (2013.01); *G01M 3/3236* (2013.01)

(58) Field of Classification Search
CPC .......... G01M 3/02; G01M 3/26; G01M 3/10; G01M 3/106; G01M 3/3236; G01M 3/3263; F02M 25/0818; F02M 25/0809; F02M 26/49; F02M 2700/05
See application file for complete search history.

(56) References Cited

U.S. PATENT DOCUMENTS 5,220,898 A * 6/1993 Kidokoro ............... F02M 25/08
                                                    123/519
5,295,472 A * 3/1994 Otsuka ............... F02M 25/0809
                                                    123/198 D
(Continued)

FOREIGN PATENT DOCUMENTS

JP        2004-156498      6/2004
JP        2006-37783       2/2006
(Continued)

*Primary Examiner* — David A Rogers
(74) *Attorney, Agent, or Firm* — Drinker Biddle & Reath LLP (57) ABSTRACT

An evaporated fuel processing apparatus includes a valve between a canister and a fuel tank, and maintains the fuel tank in hermetic state by closing the valve while a vehicle is stationary, and adsorbs evaporated fuel by the canister by opening the valve during fuel filling, wherein the evaporated fuel occurs in the fuel tank. A diagnostic apparatus includes: a pump connected to a canister-side region with respect to the valve, and configured to pressurize a system of the canister and the fuel tank; and a pressure sensor for sensing an internal pressure of the system. The diagnostic apparatus starts pressurization by the pump with the valve closed; brings the system into a pressurized state by opening the valve with a delay after the start of pressurization; and performs a leakage diagnosis based on a change in the internal pressure of the system from the pressurized state.

10 Claims, 5 Drawing Sheets

(51) Int. Cl.
*G01M 3/32* (2006.01)
*G01M 3/26* (2006.01)

(56) References Cited

U.S. PATENT DOCUMENTS

| | | | | |
|---|---|---|---|---|
| 5,679,890 A * | 10/1997 | Shinohara | ........... | F02M 25/0809 123/519 |
| 7,082,815 B1 | 8/2006 | Matsubara et al. | | |
| 7,204,239 B2 | 4/2007 | Iriyama | | |
| 7,366,604 B2 * | 4/2008 | Ishii | ................... | F02M 25/0827 123/520 |
| 7,383,722 B2 * | 6/2008 | Tsuyuki | ............. | F02M 25/0818 73/49.7 |
| 7,472,583 B2 * | 1/2009 | Kato | ................. | F02M 25/0809 73/49.2 |
| 8,019,525 B2 * | 9/2011 | DeBastos | ......... | B60K 15/03504 123/520 |
| 8,627,802 B2 * | 1/2014 | Horiba | ................ | F02D 41/0032 123/520 |
| 8,850,873 B2 * | 10/2014 | Itoh | .................... | F02M 25/0818 73/47 |
| 9,341,538 B2 * | 5/2016 | Horiba | ................ | G01M 3/2876 |
| 2002/0189328 A1 * | 12/2002 | Saito | .................. | F02M 25/0809 73/49.7 |
| 2003/0183206 A1 * | 10/2003 | Fujimoto | ............ | F02D 41/0045 123/520 |
| 2003/0226549 A1 * | 12/2003 | Takagi | ............... | F02M 25/0818 123/520 |
| 2004/0163452 A1 * | 8/2004 | Oki | .................... | F02M 25/0809 73/114.41 |
| 2004/0186638 A1 * | 9/2004 | Lederle | ............... | F02M 25/0809 73/40 |
| 2005/0011499 A1 * | 1/2005 | Hara | .................... | F02M 25/089 123/520 |
| 2005/0044942 A1 * | 3/2005 | Amano | ................ | F02M 25/0809 73/114.41 |
| 2005/0217645 A1 * | 10/2005 | Fukaya | ................ | F02M 25/089 123/519 |
| 2006/0016252 A1 * | 1/2006 | Iriyama | .............. | F02M 25/0809 73/114.39 |
| 2006/0086343 A1 * | 4/2006 | Suzuki | ............... | F02M 25/0809 123/520 |
| 2009/0277251 A1 * | 11/2009 | Takakura | ........... | F02M 25/0809 73/40.7 |
| 2014/0182360 A1 * | 7/2014 | Horiba | ................ | G01M 3/2876 73/40.5 R |
| 2015/0040645 A1 | 2/2015 | Takakura et al. | | |

FOREIGN PATENT DOCUMENTS

| | | |
|---|---|---|
| JP | 4107053 B2 | 6/2008 |
| JP | 2010281258 A * | 12/2010 |

* cited by examiner

DEVICE AND METHOD FOR DIAGNOSING EVAPORATED FUEL PROCESSING DEVICE

TECHNICAL FIELD

The present invention relates to an evaporated fuel processing apparatus that employs a canister to process evaporated fuel occurring in a fuel tank during fuel filling, and relates particularly to a diagnostic apparatus and a diagnostic method for diagnosing whether or not the evaporated fuel processing apparatus is leaking.

BACKGROUND ART

An evaporated fuel processing apparatus has been widely used, which is configured to: temporarily adsorb evaporated fuel in a canister for preventing the evaporated fuel from flowing to the outside, wherein the evaporated fuel occurs in a fuel tank of a vehicle, and the canister is made of an adsorbent such as activated carbon; and thereafter purge a fuel component from the canister by introduction of fresh air and introduce the fuel component into an intake air line of an internal combustion engine while the internal combustion engine is operating.

A patent document 1 discloses an evaporated fuel processing apparatus which includes a blocking valve in a passage between a fuel tank and a canister, and is configured to adsorb evaporated fuel from the fuel tank into the canister, basically only during fuel filling. This system is configured to maintain the fuel tank in hermetic state by the blocking valve when a vehicle is stationary and no fuel filling is being performed, and thereby more reliably prevent evaporated fuel from flowing to the outside.

The evaporated fuel processing apparatus according to patent document 1 is provided with a diagnostic apparatus for diagnosing whether or not each part is leaking. This diagnostic apparatus includes a negative pressure pump connected to a drain port side of the canister, and performs a leakage check in suitable timing while the vehicle is stationary, wherein the leakage check includes: depressurizing an inside of a system including the fuel tank and the canister; and determining whether or not leakage is present, based on a change in internal pressure of the system at that time.

However, in the conventional diagnostic apparatus, air is sucked by the negative pressure pump from the system via the canister, so that when a large amount of evaporated fuel is adsorbed in the canister, a fuel component may flow from the canister to the outside via the negative pressure pump. Accordingly, this apparatus has a defect that the frequency of situations where the diagnosis is actually possible is low.

Moreover, in the method based on depressurization of the inside of the system, pressure reduction in the fuel tank promotes evaporation of fuel, and thereby increases the amount of evaporated fuel occurring in the fuel tank, so that the evaporated fuel flows into the canister by action of the negative pressure pump, and the adsorbed amount in the canister increases, and the canister thereby approaches a breakthrough (a condition where the amount of evaporated fuel exceeds the capacity of the canister, so that the canister cannot adsorb a further amount of evaporated fuel) undesirably.

PRIOR ART DOCUMENT(S)

Patent Document(s)

Patent Document 1: Japanese Patent No. 4107053

SUMMARY OF THE INVENTION

A diagnostic apparatus according to the present invention is provided for an evaporated fuel processing apparatus, wherein the evaporated fuel processing apparatus includes a blocking valve configured to selectively allow and shut off communication between a canister and a fuel tank, and maintains the fuel tank in hermetic state by closing the blocking valve while a vehicle is stationary, and adsorbs evaporated fuel by the canister by opening the blocking valve during fuel filling, wherein the evaporated fuel occurs in the fuel tank. The diagnostic apparatus comprises: a pump connected to a canister-side region with respect to the blocking valve, and configured to pressurize an inside of a system, wherein the system includes the canister and the fuel tank; and at least one pressure sensor configured to sense an internal pressure of the system; wherein the diagnostic apparatus is configured to: start pressurization by the pump with the blocking valve closed; bring the inside of the system into a pressurized state by opening the blocking valve with a delay of a predetermined period after the start of pressurization; and perform a leakage diagnosis based on a change in the internal pressure of the system from the pressurized state.

Namely, the diagnostic apparatus according to the present invention causes the pump to pressurize the system including the fuel tank and the canister, and determines whether leakage is present, based on pressure change thereafter. This prevents a fuel component from being sucked from the canister to the outside. Accordingly, the diagnostic apparatus can perform the diagnosis even in a situation where a relatively large amount of evaporated fuel is adsorbed in the canister. Moreover, since the internal pressure of the system is raised during the diagnosis, evaporation of fuel in the fuel tank is suppressed in contrast to the conventional technology.

Furthermore, the feature that the pressurization of the inside of the system for the diagnosis is implemented by first pressurizing the canister-side region with respect to the blocking valve by the pump connected to the canister-side region, and then opening the blocking valve with a delay thereafter, serves to prevent evaporated fuel from flowing from the fuel tank side to the canister side at the moment when the blocking valve becomes opened. In many cases, at the time of the vehicle stationary condition where leakage diagnosis is performed, the internal pressure of the fuel tank is higher than that of the canister-side region. If the blocking valve is opened at the same time as the start of operation of the pump under that condition, evaporated fuel flows instantaneously from the fuel tank side region to the canister side region, and is adsorbed in the canister. According to the present invention, the feature that the blocking valve is opened after the pressure of the canister side region is raised to some extent, serves to suppress the useless increase of the adsorbed amount in the canister.

Accordingly, the present invention makes it possible to perform the diagnosis even when a relatively large amount of evaporated fuel is adsorbed in the canister, and suppress the increase of the adsorbed amount in the canister which accompanies the diagnosis.

MODE(S) FOR CARRYING OUT THE INVENTION

Figure 1:
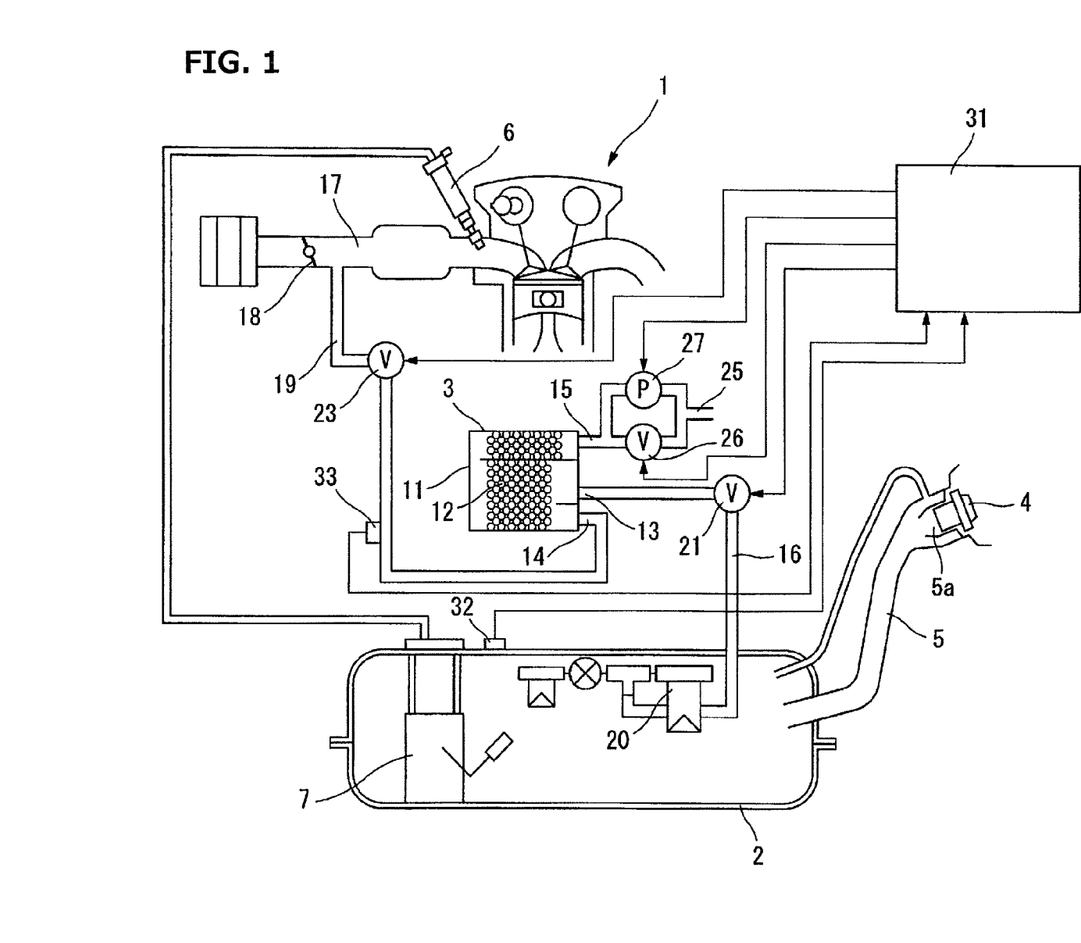
FIG. 1 is a configuration diagram showing an embodiment of an evaporated fuel processing apparatus provided with a diagnostic apparatus according to the present invention.

FIG. 1 is a configuration diagram showing an embodiment of an evaporated fuel processing apparatus provided with a diagnostic apparatus according to the present invention. An internal combustion engine 1 is mounted on a vehicle not shown which is provided with a fuel tank 2 of a hermetic type, and is provided with an evaporated fuel processing apparatus which employs a canister 3 for processing evaporated fuel occurring in fuel tank 2 during fuel filling. The fuel tank 2 includes a filler pipe part 5 having a filler opening 5a at its tip, wherein a filler cap 4 is attached detachably to filler opening 5a. A fuel pump unit 7 is mounted in fuel tank 2 for supplying fuel to a fuel injection device 6 of internal combustion engine 1.

The canister 3 includes an U-shaped flow path formed by a case 11 made of synthetic resin, and is filled therein with an adsorbent 12 made of activated carbon or the like. One end portion of the U-shaped flow path in the flow direction is provided with a charge port 13 serving as a part where evaporated fuel inflows and a purge port 14 serving as a part where purge gas including a fuel component outflows. The other end of the U-shaped flow path in the flow direction is provided with a drain port 15 for introducing outside air during purging.

The charge port 13 is connected to an upper space of fuel tank 2 via an evaporated fuel passage 16. The end portion of the evaporated fuel passage 16 closer to fuel tank 2 is communicated with the upper space of fuel tank 2 via an FLV valve 20 which prevents liquid fuel from moving into evaporated fuel passage 16 when the level of fuel is high. An intermediate point of the evaporated fuel passage 16 is provided with a blocking valve 21 that selectively opens and closes the evaporated fuel passage 16. The blocking valve 21 serves to shut off communication between canister 3 and fuel tank 2 and thereby bring the fuel tank 2 into hermetic state, basically when no fuel filling is performed. Blocking valve 21 is implemented by a normally closed electromagnetic valve which is closed when de-energized.

The purge port 14 is connected via a purge passage 19 to an intake air line of internal combustion engine 1, for example, connected to a downstream side of an intake air passage 17 with respect to a throttle valve 18. The purge passage 19 is provided with a purge control valve 23 which controls introduction of purge gas into internal combustion engine 1. Purge control valve 23 is configured to inhibit introduction of purge gas in a specific situation such as a situation before internal combustion engine 1 is warmed up or a situation of fuel cutoff. The purge control valve 23 is also implemented by a normally closed electromagnetic valve. The purge control valve 23 may be selectively opened and closed simply by on-off control, or may be controlled by duty ratio control such that the flow rate of purge gas can be changed continuously.

The drain port 15 is connected to a drain passage 25 whose distal end is opened to the atmosphere. The drain passage 25 is provided therein with a drain cutoff valve 26 that selectively opens and closes the drain passage 25. The drain cutoff valve 26 is implemented by a normally opened electromagnetic valve which is opened when de-energized. The drain cutoff valve 26 closes the system during a leakage diagnosis detailed below. In addition, drain cutoff valve 26 may be closed when breakthrough of canister 3 is detected by some means. However, drain cutoff valve 26 is usually in open state to open the drain passage 25. The drain cutoff valve 26 is provided with a pump 27 in parallel with the drain cutoff valve 26, wherein pump 27 sends atmospheric air under pressure to canister 3. The pump 27 may be of any type if pump 27 is capable of pressurizing the inside of the system including the canister 3 and fuel tank 2. However, it is preferable that pump 27 is configured such that no gas flows through pump 27 when pump 27 is de-energized.

The blocking valve 21, purge control valve 23, drain cutoff valve 26, and pump 27 are controlled suitably by an engine control unit 31 which performs various controls of internal combustion engine 1 (fuel injection quantity control, fuel injection timing control, ignition timing control, opening control of throttle valve 18, etc.). As described below, engine control unit 31 performs an adsorption processing during fuel filling, a purge processing during operation, a leakage diagnosis after operation of the vehicle is stopped, etc. As pressure sensors for sensing the internal pressure of the system, a tank pressure sensor 32 is attached to fuel tank 2, and an evaporation system pressure (referred to as evaporation pressure as a shortened term) 33 is attached to an upstream side (closer to canister 3) of purge passage 19 with respect to purge control valve 23. Namely, this embodiment is provided with two pressure sensors for sensing the internal pressure of the system, wherein the tank pressure sensor 32 senses the pressure of a region of the system closer to fuel tank 2 which is a half separated by blocking valve 21 (henceforth referred to as tank pressure), specifically, the pressure of the upper space of fuel tank 2, and wherein the evaporation pressure sensor 33 senses the pressure of a region of the system including the canister 3 which is a half separated by blocking valve 21 (namely, a region enclosed by drain cutoff valve 26, purge control valve 23, and blocking valve 21) (referred to as evaporation pressure in this description).

The evaporated fuel processing apparatus configured as described above is configured to basically adsorb in canister 3 only evaporated fuel occurring during fuel filling, and maintains fuel tank 2 in hermetic state except during fuel filling. When engine control unit 31 recognizes a fuel filling situation, for example, based on operation of a fuel lid opener not shown (a mechanism for opening and closing a lid of a vehicle body which covers the filler opening 5a), purge control valve 23 is closed, and blocking valve 21 is opened, allowing communication between the inside of fuel tank 2 and the charge port 13 of canister 3, under the condition that drain cutoff valve 26 is opened. Accordingly, evaporated fuel occurring in fuel tank 2 during fuel filling is introduced into canister 3, and is adsorbed by adsorbent 12 of canister 3.

Upon termination of the fuel filling, blocking valve 21 is brought into closed state. Accordingly, the inside of fuel tank 2 is maintained in hermetic state, separated from canister 3, so that the adsorbed amount in canister 3 is unchanged basically when internal combustion engine 1 is at rest. When operation of the vehicle is started and internal combustion engine 1 is brought into a predetermined operation state, a fuel component is purged from canister 3 by suitably opening the purge control valve 23 while maintaining the blocking valve 21 closed. Namely, the atmospheric air is introduced through the drain port 15 by a difference in pressure from the intake air line of internal combustion engine 1, so that the fuel component purged from adsorbent 12 by the atmospheric air is introduced into intake air passage 17 of internal combustion engine 1 via the purge control valve 23. Accordingly, while internal combustion engine 1 is operating, the adsorbed amount in canister 3 decreases gradually. The evaporated fuel processing apparatus is configured to allow adsorption in canister 3 only during fuel filling, basically. However, when the pressure of fuel tank 2 becomes significantly high due to temperature change or the like during operation of internal combustion engine 1, blocking valve 21 may be configured to be temporarily opened exceptionally. In such a case, evaporated fuel moving to canister 3 via blocking valve 21 flows from charge port 13 to the adjacent purge port 14 through a shortcut, and then is directly introduced into intake air passage 17 of internal combustion engine 1, so that the evaporated fuel is little adsorbed in adsorbent 12 of canister 3.

In this way, in the evaporated fuel processing apparatus described above, communication between canister 3 and fuel tank 2 is allowed only during fuel filling, and fuel tank 2 is brought into hermetic state except during fuel filling. This serves to suppress leakage of evaporated fuel to the outside to a significantly low level.

In the present embodiment, engine control unit 31 performs whether or not leakage is present in each section, in suitable timing after operation of the vehicle is stopped (for example, a several hours after operation stop), in order to ensure intended performance of the evaporated fuel processing apparatus.

Figure 2:
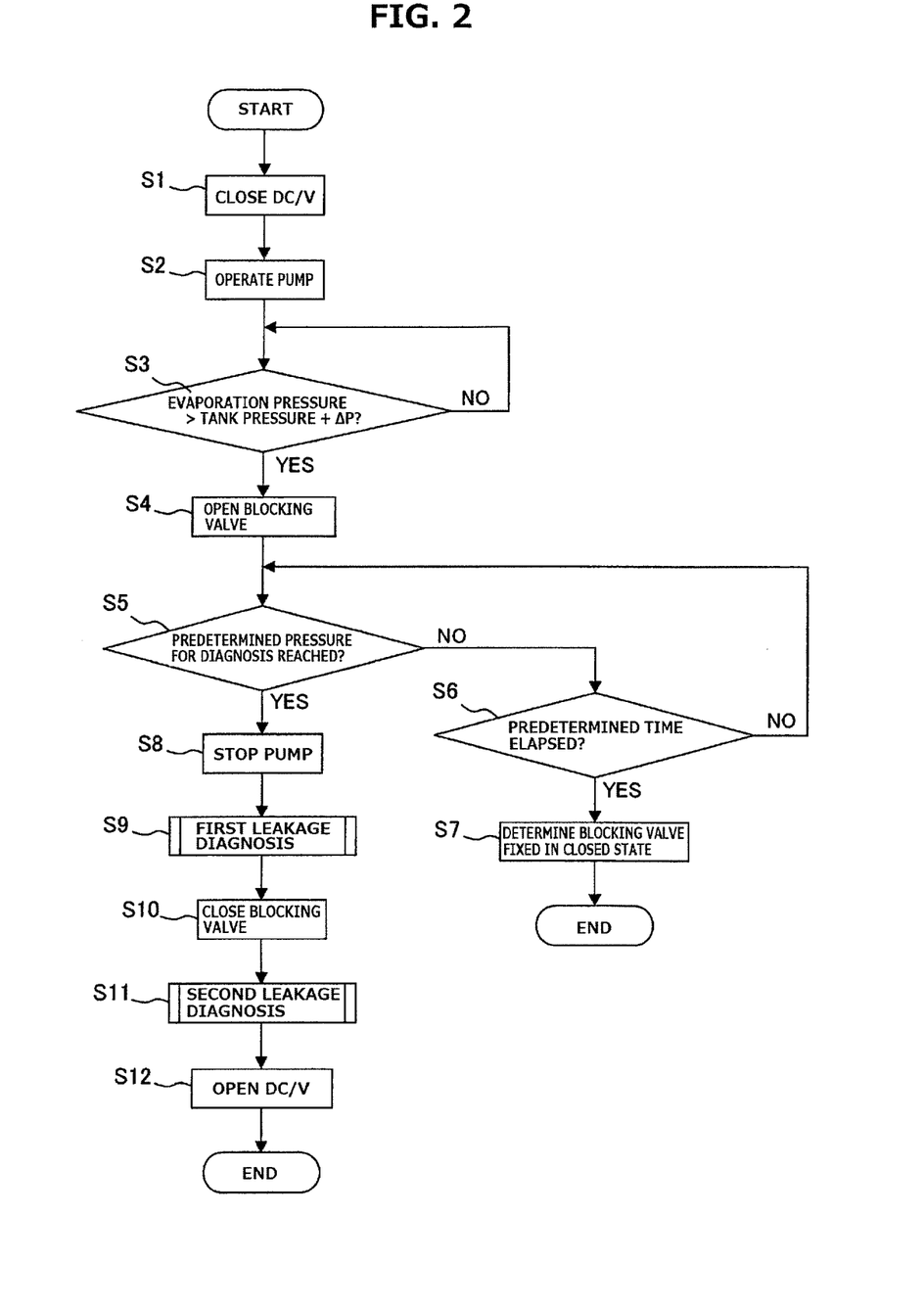
FIG. 2 is a flow chart showing a flow of diagnosis processing according to the embodiment.

FIG. 2 is a flow chart showing a flow of the leakage diagnosis processing. The following describes the flow chart of FIG. 2 with reference to a time chart of FIG. 5. For example, when a predetermined time period has elapsed after a vehicle stop, engine control unit 31 starts a leakage diagnosis. First of the leakage diagnosis, engine control unit 31 closes drain cutoff valve 26 at Step 1. Next, at Step 2, engine control unit 31 turns on the pump 27. Although the starting-up of pump 27 may be substantially simultaneous with the switching of drain cutoff valve 26, pump 27 is turned on with some delay from switching of drain cutoff valve 26 as shown in the time chart of FIG. 5 in this example. Because both of blocking valve 21 and purge control valve 23, which are normally closed electromagnetic valves, are closed, the turning-on of pump 27 causes an increase in the pressure of the region closer to canister 3 with respect to blocking valve 21, namely, the evaporation pressure. In this stage, the pressure of the fuel tank side region, namely, the tank pressure, is unchanged, because blocking valve 21 is closed.

Figure 5:
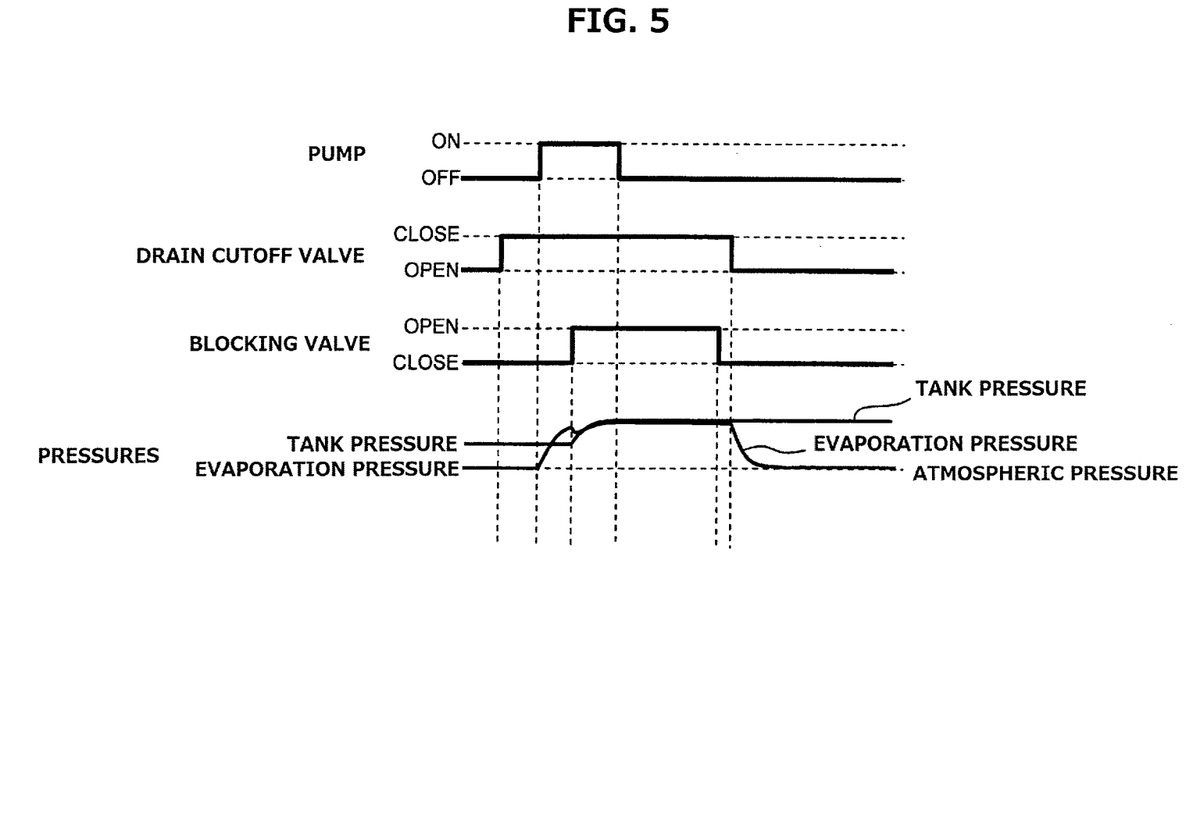
FIG. 5 is a time chart showing changes of a pressure and others during the diagnosis.

At Step 3, engine control unit 31 determines repeatedly whether or not the evaporation pressure of the canister side becomes higher than the tank pressure of the fuel tank side, specifically, whether or not the evaporation pressure is higher by a predetermined pressure difference $\Delta P$ than the tank pressure. When this condition is satisfied, engine control unit 31 proceeds to Step 4 where engine control unit 31 switches blocking valve 21 into open state. Accordingly, the pressurization by pump 27 is applied also to the fuel tank side, so that the tank pressure and the evaporation pressure become equal to each other, and gradually rise as shown in FIG. 5. At the moment when blocking valve 21 is opened, the evaporation pressure falls slightly due to volume increase on one hand, and the tank pressure rises under influence of the evaporation pressure on the other hand, so that the tank pressure and the evaporation pressure become equal to each other instantaneously.

As shown in FIG. 5, the tank pressure at the time of start of the diagnosis is slightly higher in general due to evaporative pressure of fuel than the evaporation pressure that is equal to the atmospheric pressure at the time of start of the diagnosis. Accordingly, if blocking valve 21 is opened simultaneously with the start of operation of pump 27, evaporated fuel in fuel tank 2 flows into canister 3 due to a differential pressure, thereby increasing the adsorbed amount in canister 3 unnecessarily. In contrast, in the present embodiment, the opening timing of blocking valve 21 is delayed with respect to the start of operation of pump 27, specifically, the blocking valve 21 is opened after the evaporation pressure of the canister side becomes sufficiently higher than the tank pressure of the fuel tank side. This prevents a gas flow from fuel tank 2 to canister 3, and allows evaporated fuel to be maintained in fuel tank 2. Conversely, in the present embodiment, at the moment when blocking valve 21 is opened, gas moves via blocking valve 21 from the canister side region to the fuel tank side region, thereby causing an effect of actively pressing the evaporated fuel back to the fuel tank side.

In the present embodiment, although Step 3 requires the condition that the evaporation pressure is higher by the predetermined pressure difference $\Delta P$ than the tank pressure, this may be modified such that blocking valve 21 is opened when the evaporation pressure becomes higher than or equal to the tank pressure.

At Step 5, engine control unit 31 determines whether or not the tank pressure and the evaporation pressure (or the tank pressure only) have reached a predetermined pressure for diagnosis. When the answer is NO, the determination of Step 5 is repeated until a predetermined time period has elapsed at Step 6. If the tank pressure fails to reach the predetermined pressure even when the predetermined time period has elapsed, engine control unit 31 proceeds to Step 7 where engine control unit 31 determines that blocking valve 21 is in an abnormal state in which blocking valve 21 is fixed in closed state. Then, engine control unit 31 terminates the diagnosis.

When the predetermined pressure is reached, engine control unit 31 proceeds from Step 5 to Step 8 where engine control unit 31 stops pump 27. Under this condition, namely, under the condition that blocking valve 21 is opened to allow communication between fuel tank 2 and canister 3, engine control unit 31 performs a first leakage diagnosis at Step 9. After termination of the first leakage diagnosis detailed below, engine control unit 31 proceeds to Step 10 where engine control unit 31 switches blocking valve 21 into closed state. Under this condition, namely, under the condition that blocking valve 21 is closed to separate the fuel tank 2 and canister 3 from each other, engine control unit 31 performs a second leakage diagnosis at Step 11. After termination of the second leakage diagnosis detailed below, engine control unit 31 proceeds to Step 12 where engine control unit 31 switches drain cutoff valve 26 into open state, and then terminates the sequence of diagnosis processing. By the event that drain cutoff valve 26 is opened, the evaporation pressure of the canister side decreases to the atmospheric pressure as shown in FIG. 5.

Figure 3:
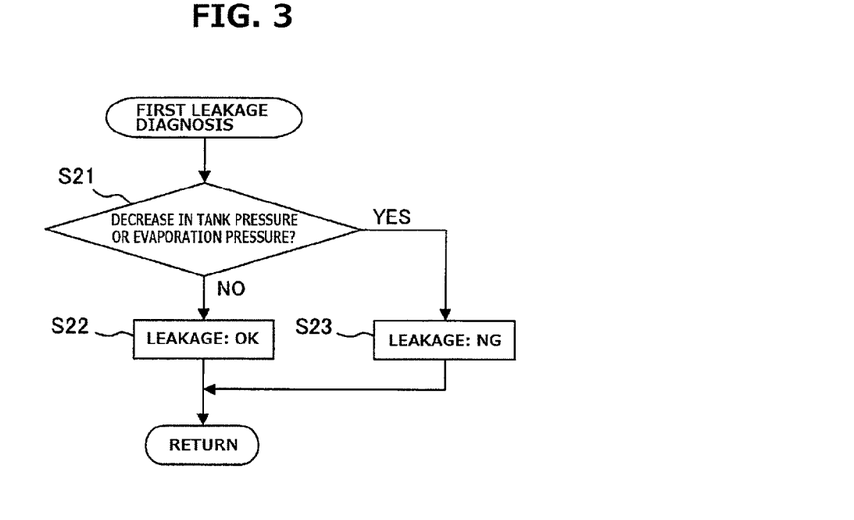
FIG. 3 is a flow chart showing a detailed part of the flow chart of FIG. 2.

FIG. 3 shows the first leakage diagnosis in detail. As described above, under the condition that blocking valve 21 is opened, drain cutoff valve 26 is closed, purge control valve 23 is closed, and the inside of the system is pressurized up to the predetermined pressure, engine control unit 31 determines whether or not the tank pressure or evaporation pressure has decreased, as shown at Step 21. This is determined based on a pressure change amount after a predetermined time period has elapsed, or a pressure change rate with respect to time, for example. When no pressure decrease is present, engine control unit 31 determines at Step 22 that no leakage is present. When a pressure decrease is present, engine control unit 31 determines at Step 23 that leakage is present. This allows to diagnose whether or not leakage is present due to a sealing failure of drain cutoff valve 26 or purge control valve 23 when drain cutoff valve 26 or purge control valve 23 is closed, or due to leakage through a pin hole of fuel tank 2 or through a portion of canister 3.

Figure 4:
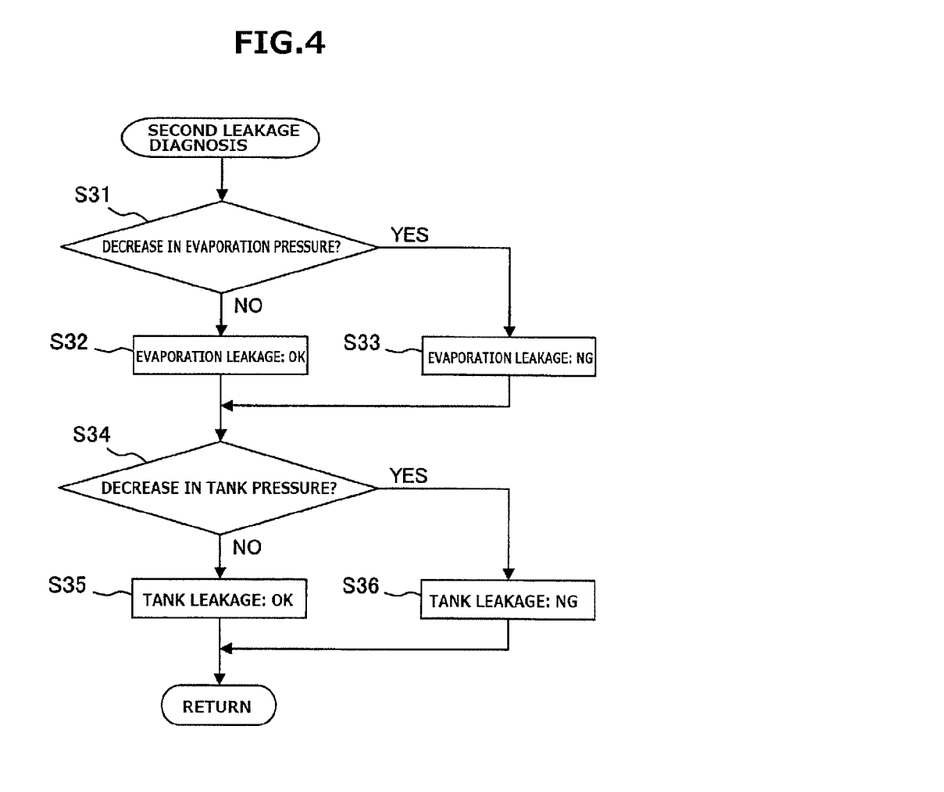
FIG. 4 is a flow chart showing a detailed part of the flow chart of FIG. 2.

FIG. 4 shows the second leakage diagnosis in detail. Especially under the condition that blocking valve 21 is closed, engine control unit 31 determines at Step 31 whether or not the evaporation pressure has decreased, and determines at Step 34 whether or not the tank pressure has decreased. This is determined based on a pressure change amount after a predetermined time period has elapsed, or a pressure change rate with respect to time. When no decrease occurs in the evaporation pressure, engine control unit 31 determines at Step 32 that no leakage is present in the canister side region with respect to blocking valve 21. When a decrease occurs in the evaporation pressure, engine control unit 31 determines at Step 33 that leakage is present in the canister side region with respect to blocking valve 21. Similarly, when no decrease occurs in the tank pressure, engine control unit 31 determines at Step 35 that no leakage is present in the fuel tank side region with respect to blocking valve 21. When a decrease occurs in the tank pressure, engine control unit 31 determines at Step 36 that leakage is present in the fuel tank side region with respect to blocking valve 21. In addition to the first leakage diagnosis, the second leakage diagnosis allows to diagnose which of the regions a leakage occurs in, and allows to detect a sealing failure of blocking valve 21 when blocking valve 21 is closed.

Although both of the first leakage diagnosis and the second leakage diagnosis are performed in the present embodiment, the present invention may be configured to perform only one of the first leakage diagnosis and the second leakage diagnosis.

When the diagnosis is thus completed, the tank pressure of the fuel tank side is in the pressurized state up to the predetermined pressure for diagnosis, if no leakage is present in each part. The configuration that blocking valve 21 is a normally closed electromagnetic valve serves to maintain the inside of fuel tank 2 in pressurized state basically until a next fuel filling operation after completion of the diagnosis.

According to the present embodiment, it is naturally possible to prevent a useless increase of evaporated fuel resulting from depressurization during diagnosis as in patent document 1, and also suppress actively the occurrence of evaporated fuel in fuel tank 2 until a next fuel filling operation, by bringing the fuel tank 2 in hermetic state under high pressure after completion of the diagnosis. Namely, it is possible to reduce the amount of evaporated fuel in itself which is to be processed in canister 3. The diagnosis method based on pressurization of the system can perform a diagnosis even when the adsorbed amount in canister 3 is large, and can perform a diagnosis independently of the magnitude of the adsorbed amount in canister 3 after operation stop.

The feature that the opening of blocking valve 21 for diagnosing is implemented by opening the blocking valve 21 when the pressure of the canister side region becomes higher than the pressure of the fuel tank side region after start of operation of pump 27, serves to prevent evaporated fuel from moving to canister 3 instantaneously when blocking valve 21 is opened, even if the internal pressure of fuel tank 2 is a positive pressure at the time of start of diagnosis.

Moreover, in the present embodiment, the pressurization of the system, namely, the pressurization of fuel tank 2, is implemented through the canister 3 by pump 27 that is connected to drain port 15 of canister 3, so that purge gas including a fuel component which is purged from canister 3 by air flow for pressurization flows into fuel tank 2. Namely, part of the evaporated fuel adsorbed in canister 3 is brought back into fuel tank 2, so that the adsorbed amount in canister 3 decreases. Furthermore, since the adsorbed amount in adsorbent 12 located close to drain port 15 decreases significantly, it is possible to suppress the occurrence of a smell of fuel due to leakage of a very small amount of the fuel component to the outside.

Since blocking valve 21 is implemented by a normally closed electromagnetic valve and drain cutoff valve 26 is implemented by a normally opened electromagnetic valve in the present embodiment, it is possible to maintain only the fuel tank side region in pressurized hermetic state, while requiring no active energization.

Figure 6:
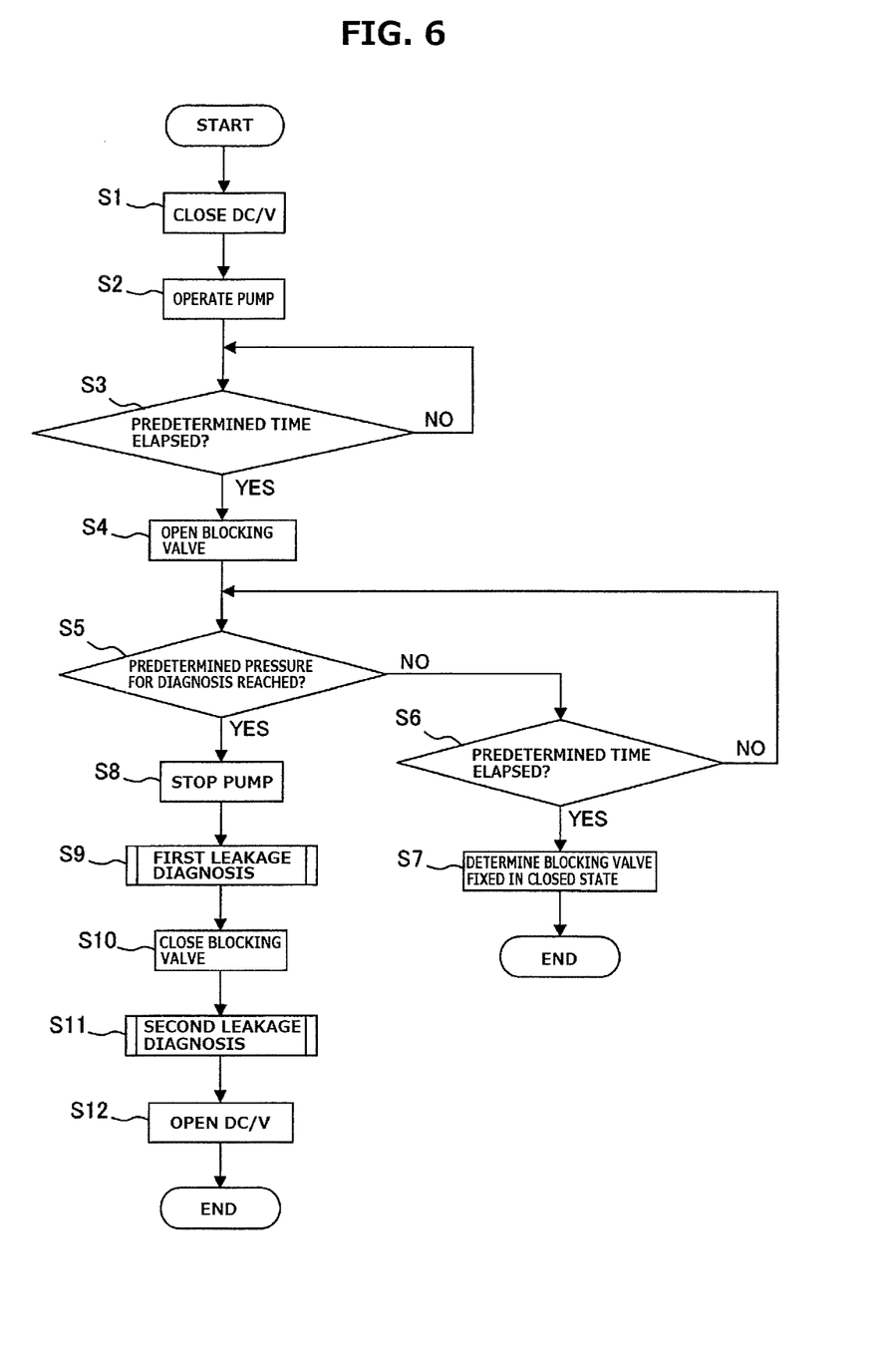
FIG. 6 is a flow chart showing a modified example of diagnosis processing.

FIG. 6 is a flow chart showing an embodiment in which a part of the diagnosis processing of FIG. 2 is modified. In this embodiment, Step 3 of FIG. 2 is replaced with Step 3A where engine control unit 31 determines whether or not an elapsed time period after the turning-on of pump 27 (at Step 2) has reached a predetermined time period. When the predetermined time period has elapsed after the turning-on of pump 27, engine control unit 31 proceeds to Step 4 where engine control unit 31 opens blocking valve 21. The other operations are the same as in the embodiment shown in FIG. 2.

The predetermined time period is set such that the evaporation pressure becomes higher than or equal to the tank pressure by action of pump 27, and may be a predetermined constant value, or may be set variably depending on another parameter such as the internal pressure of fuel tank 2 (tank pressure) or the temperature of fuel.

Also in this embodiment, it is possible to suppress evaporated fuel in fuel tank 2 from moving to canister 3, because blocking valve 21 is opened when the pressure of the canister side (evaporation pressure) becomes high to some extent by pump 27. This embodiment is based on no comparison between the evaporation pressure and tank pressure, and therefore may be easily applied to a configuration provided with only one of tank pressure sensor 32 and evaporation pressure sensor 33 as a pressure sensor.

Even if the pressure in the canister side is slightly lower than the internal pressure of fuel tank 2 after the lapse of the predetermined time period, the pressure of the canister side is closer to the pressure of fuel tank 2 as compared to the time when pump 27 is turned on, so that it is possible to suppress gas movement at the moment when blocking valve 21 is opened.

Although the invention is described above with reference to certain embodiments, the invention is not limited to the embodiments, but may be modified variously. For example, although two pressure sensors 32, 33 are used to recognize which of the two regions a leakage is present in, with blocking valve 21 closed, in the present embodiment, provision of only one of the pressure sensors is sufficient if it is simply targeted for sensing leakage in the entire system. Moreover, although pump 27 is arranged in parallel with drain cutoff valve 26, pump 27 may be arranged in series with drain cutoff valve 26, or may be arranged independently of drain cutoff valve 26.

The invention claimed is:

1. A diagnostic apparatus for an evaporated fuel processing apparatus, wherein the evaporated fuel processing apparatus includes a blocking valve configured to selectively allow and shut off communication between a canister and a fuel tank, and maintains the fuel tank in hermetic state by closing the blocking valve while a vehicle is stationary, and adsorbs evaporated fuel by the canister by opening the blocking valve during fuel filling, wherein the evaporated fuel occurs in the fuel tank, the diagnostic apparatus comprising:
   a pump connected to a canister-side region with respect to the blocking valve, and configured to pressurize an inside of a system, wherein the system includes the canister and the fuel tank; and
   at least one pressure sensor configured to sense an internal pressure of the system;
   wherein the diagnostic apparatus is configured to:
      start pressurization by the pump with the blocking valve closed;
      bring the inside of the system into a pressurized state by opening the blocking valve with a delay of a predetermined period after the start of pressurization; and
      perform a leakage diagnosis based on a change in the internal pressure of the system from the pressurized state.

2. The diagnostic apparatus as claimed in claim 1, wherein the diagnostic apparatus is configured to open the blocking valve in response to a condition where a pressure of the canister-side region becomes higher than or equal to a pressure of a fuel-tank-side region after the start of pressurization by the pump.

3. The diagnostic apparatus as claimed in claim 2, wherein the diagnostic apparatus is configured to open the blocking valve in response to a condition where the pressure of the canister-side region becomes higher than the pressure of the fuel-tank-side region by a predetermined pressure difference.

4. The diagnostic apparatus as claimed in claim 1, wherein the diagnostic apparatus is configured to open the blocking valve in response to a condition where a predetermined time has elapsed after the start of pressurization by the pump.

5. The diagnostic apparatus as claimed in claim 1, wherein the canister includes a first end and a second end in a flow direction, wherein a charge port and a purge port is arranged at the first end, and a drain port is disposed at the second end, wherein the second end is connected to the pump.

6. The diagnostic apparatus as claimed in claim 1, wherein the diagnostic apparatus is configured to maintain an inside of the fuel tank pressurized, by closing the blocking valve after termination of the diagnosis.

7. The diagnostic apparatus as claimed in claim 1, wherein:
   the at least one pressure sensor includes a pressure sensor provided in the canister-side region with respect to the blocking valve, and a pressure sensor provided in the fuel-tank-side region with respect to the blocking valve; and
   the diagnostic apparatus is configured to:
      close the blocking valve after the inside of the entire system has been made pressurized by opening the blocking valve; and
      perform a leakage diagnosis for each of the canister-side region and the fuel-tank-side region.

8. A diagnostic method for an evaporated fuel processing apparatus, wherein the evaporated fuel processing apparatus includes a blocking valve configured to selectively allow and shut off communication between a canister and a fuel tank, and maintains the fuel tank in hermetic state by closing the blocking valve while a vehicle is stationary, and adsorbs evaporated fuel by the canister by opening the blocking valve during fuel filling, wherein the evaporated fuel occurs in the fuel tank, the diagnostic method comprising:
   bringing an inside of a system into hermetic state, wherein the system includes the canister and the fuel tank;
   starting pressurization by a pump via a canister-side region with respect to the blocking valve, with the blocking valve closed;
   opening the blocking valve with a delay of a predetermined period after the start of pressurization;
   stopping the pressurization in response to a condition where the inside of the entire system has been brought into a predetermined pressurized state; and
   performing a leakage diagnosis based on a change in internal pressure of the system from the pressurized state.

9. The diagnostic method as claimed in claim 8, comprising opening the blocking valve in response to a condition where a pressure of the canister-side region becomes higher than or equal to a pressure of a fuel-tank-side region after the start of pressurization by the pump.

10. The diagnostic method as claimed in claim 8, comprising opening the blocking valve in response to a condition where a predetermined time has elapsed after the start of pressurization by the pump.

* * * * *